Sept. 7, 1954 J. L. LAWSON ET AL 2,688,697
PULSE STRETCHER CIRCUIT
Filed March 7, 1946
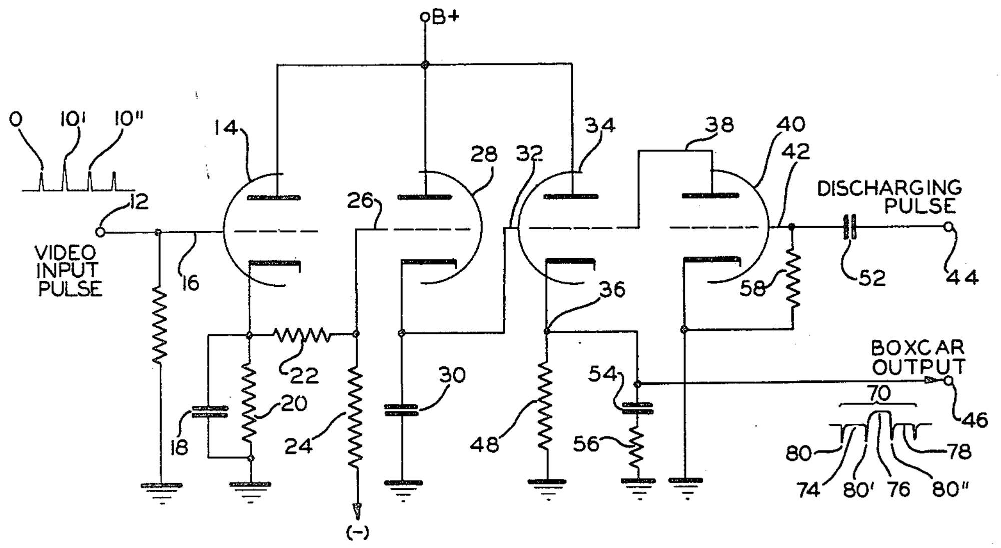
INVENTORS
JAMES L. LAWSON
LEON B. LINFORD
HAROLD L. JOHNSON
BY M. A. Hayes
ATTORNEY Patented Sept. 7, 1954 2,688,697

UNITED STATES PATENT OFFICE 2,688,697

PULSE STRETCHER CIRCUIT

James L. Lawson, Schenectady, N. Y., Leon B. Linford, Belmont, Mass., and Harold L. Johnson, Denver, Colo., assignors, by mesne assignments, to the United States of America as represented by the Secretary of the Navy Application March 7, 1946, Serial No. 652,518

3 Claims. (Cl. 250—27)

This invention relates in general to the generation of wide pulses from narrow pulses, and more specifically to such circuits which produce an output voltage with the same peak value as an input pulse and hold this value substantially unchanged until the next input pulse, at which time the output assumes the value of the later input pulse.

Circuits of this nature are used in certain radar applications and could be used in almost any pulse system where it is desired to remove the effect of the pulse repetition frequency (hereinafter abbreviated PRF) of a particular recurring pulse. To accomplish such a purpose the pulses must be effectively eliminated and at the same time the peak amplitude of the pulses must be maintained. This is done by stretching out each pulse from the time it occurs until the time of the corresponding pulse during the next cycle. In addition since the peak amplitude of each pulse must be maintained, each long pulse must be equal in amplitude to the pulse which initiated it. Thus the output from this circuit is a series of long pulses substantially equal in time to the reciprocal of the PRF of the applied pulse and if the peak voltage of the applied pulse differs from cycle to cycle then the long pulses formed will also differ in magnitude correspondingly. These long pulses are known as boxcar waves and the electrical circuit used to form these boxcar waves is known as a boxcar circuit or generator.

It is an object of this invention to provide a means for developing accurate boxcar waves from narrow pulses.

Another object of this invention is to provide a means for developing the said boxcar waves with the same amplitude as the applied pulses and with a time length equal to the time interval between said applied pulses.

A further object of this invention is to provide a circuit using a large and small capacitor for developing a series of boxcar waves each of which will be equal in amplitude to the narrow pulse which starts it and will essentially maintain this amplitude over its length to minimize hum and undesired alternating components introduced by the pulse repetition frequency.

To accomplish the foregoing general objects, and more specific objects which hereinafter appear, our invention resides in the circuit elements and their relation to one another, as are more particularly described in the following specification. The specification is accompanied by a drawing which illustrates the features of the invention.

Before proceding with a detailed description of the invention a brief outline of its operation will be given. A video voltage wave consisting of a series of pulses separated by a time interval substantially equal to the reciprocal of the PRF is applied to the circuit input. The first of these pulses when applied, charges a condenser to the actual pulse peak voltage thereof. The condenser is then disconnected from the charging circuit, and reconnected thereto just as the succeeding video pulse is applied to the input. The condenser is charged to the peak voltage of this succeeding video pulse. During the period between video pulses the voltage on the condensers does not change appreciably. The output which is the voltage on this condenser, is a series of boxcar waves (waves with a constant amplitude over the length of time between pulses) each lasting for a period equal to substantially the reciprocal of the PRF.

Rapid condenser charging during a pulse and very low leakage during the boxcar cycle is obtained by a switch having a very large ratio of resistance between the non-conducting and conducting states. A large condenser is needed to obtain very low leakage during the boxcar. This is just the opposite from what is needed to obtain rapid charging to the peak value of a narrow pulse. To overcome such difficulties here a small condenser is charged by the applied pulse and this in turn will hold its charge for a few microseconds to charge a large capacitor to peak voltage. Then the large capacitor will hold the charge for the long time required to form an accurate boxcar wave.

Such a system is provided by this invention which will now be described in detail with reference to the figure. Video pulses 10, 10′, 10″, etc., are applied at terminal 12 to the grid 16 of electron tube 14. Tube 14 applies these pulses to capacitor 18 charging it to the peak amplitude of the applied pulse 10 in an extremely short time, approximately .25 usec for the present example. When tube 14 stops conducting the voltage thus built up on capacitor 18 leaks off slowly through resistor 20 and resistors 22 and 24.

The voltage on capacitor 18 is applied through resistor 22 to the grid 26 of cathode follower 28. The boxcar capacitor 30 is connected in the cathode of said cathode follower 28. The potential wave across capacitor 18 remains at its peak value long enough to charge up capacitor 30 rapidly, that is in a few micro-seconds, to the peak voltage of the applied pulse 10. Capacitor 30, a comparatively large capacitor, is thus charged up rapidly and will hold its charge for a considerable time to give a fairly constant output wave.

The tubes 14 and 28 which are used do not have sharp current cut-off charactristics. Therefore, to insure constant output from capacitor 30 with small video signal amplitudes, resistor 22 is returned through resistor 24 to a slightly negative potential. In this manner as soon as the applied video pulse is terminated tube 14 will be cutoff. Tube 28 will cut off a short time later. This insures constant or flat boxcar waves for all input signals 10, 10′, etc.

The boxcar waves developed at capacitor 30 are applied to the grid 32 of cathode follower 34. These boxcar waves will appear at point 36, the top of cathode resistor 48, and are coupled to output terminal 46. Capacitor 54 and resistor 56 act as a filter to smooth the output from cathode follower 34. Grid 32 of tube 34, which is tied to capacitor 30, also ties to plate 38 of tube 40 which is used to discharge capacitor 30. Tube 40 is normally non-conducting but just before the time of pulse 10′, which is when the boxcar waves started by pulse 10 should terminate, a discharging pulse from the radar, not shown, is applied at terminal 44 to the grid 42 of tube 40, through coupling capacitor 52. Resistor 58 serves as a bias resistor for grid 42. This discharging pulse causes tube 40 to conduct and rapidly discharge capacitor 30 to its quiescent level so that the next video pulse 10′ can produce another boxcar wave at the amplitude of pulse 10′.

Thus the output from the circuit will be a series of boxcar waves each starting with a desired video pulse and terminating with the corresponding video pulse of the next cycle. This is illustrated in the figure where the waveform 70 shows a series of boxcar waves 74, 76, and 78 developed from the applied pulses 10, 10′, 10″, etc. The amplitude of boxcar wave 74 is equal to the voltage of pulse 10, 76 is equal is equal to the voltage of pulse 10′, and 78 is equal in amplitude to the voltage of pulse 10″. The time positions 80, 80′, and 80″ correspond to the times of the pulses 10, 10′, and 10″. It should be remembered that these boxcar waves may be of different amplitudes either larger or smaller than the ones shown or all may be of equal amplitude depending on the peak voltage of the applied pulses. These boxcar waves will not contain more than a very small component of the PRF nor any of its harmonics and other noise associated with the input pulses.

It is believed that the construction and operation as well as the advantages of our improved peak boxcar circuit will be apparent from the foregoing detailed description thereof. It will also be apparent that while we have shown and described our invention in a preferred form, changes may be made in the circuits disclosed without departing from the spirit of the invention as sought to be defined in the following claims.

What is claimed is:

1. An electrical circuit comprising, an electron tube having at least a cathode, an anode and a grid, means for applying voltage pulses to the grid of said electron tube for initiating conduction therein, a first condenser in the cathode lead of said electron tube, said first condenser being chargeable in response to conduction of said electron tube, a second condenser of large capacity relative to said first condenser, means for causing said first condenser to initiate charging of said second condenser, means for maintaining the charge on said second condenser for a predetermined period, said period being substantially equal to the period between successive applied pulses, and means for deriving output pulses of a period determined by the period of maintenance of charge on said second condenser.

2. An electrical circuit comprising, a first electron tube having at least a cathode, an anode and and a grid, a direct current voltage source connected to said anode, means for applying voltage pulses to said grid for initiating conduction in said first electron tube, a parallel arranged resistor and first condenser in the cathode lead of said first electron tube, said first condenser being chargeable in response to conduction of said first electron tube, a second electron tube having at least a cathode, an anode, and a grid, a second condenser of large capacity relative to said first condenser in the cathode lead of said second electron tube, said second tube anode being connected to said voltage source, means for obtaining an output signal from the cathode of said first electron tube and applying said output signal to the grid of said second electron tube, said output signal initiating conduction in said second electron tube and thereby causing the charging of said second condenser from said voltage source, means for maintaining the charge on said second condenser for a period substantially equal to the period between said applied voltage pulses, and means for deriving output pulses of a period substantially equal to the period of maintenance of charge on said condenser.

3. An electrical circuit comprising, a first electron tube having at least a cathode, an anode and a grid, a direct current voltage source connected to said anode, means for applying voltage pulses of varying amplitudes to said grid for initiating conduction in said first electron tube, a parallel arranged resistor and first condenser connected to said cathode, said first condenser being chargeable in response to conduction of said first electron tube, a second electron tube having at least a cathode, an anode and a grid, a second condenser of large capacity relative to said first condenser connected to the cathode of said second tube, said second tube anode being connected to said voltage source, means for coupling an output voltage from said first tube cathode to said second tube grid, said output voltage initiating conduction in said second tube and thereby causing the charging of said second condenser from said voltage source, a third electron tube having at least a cathode, an anode and a grid, said third tube anode being connected to said voltage source, said third tube grid being connected to said second condenser, a resistor connected to said third tube cathode, and means connected to said third tube grid for causing conduction in said third tube, whereby an output voltage of amplitude similar to that of said applied voltage pulses but of duration substantially longer than that of said applied voltages is provided.

References Cited in the file of this patent

UNITED STATES PATENTS

| Number | Name | Date |
|---|---|---|
| 2,294,863 | Hadfield | Sept. 1, 1942 |
| 2,415,567 | Schoenfeld | Feb. 11, 1947 |
| 2,419,340 | Easton | Apr. 22, 1947 |